Figure 1:
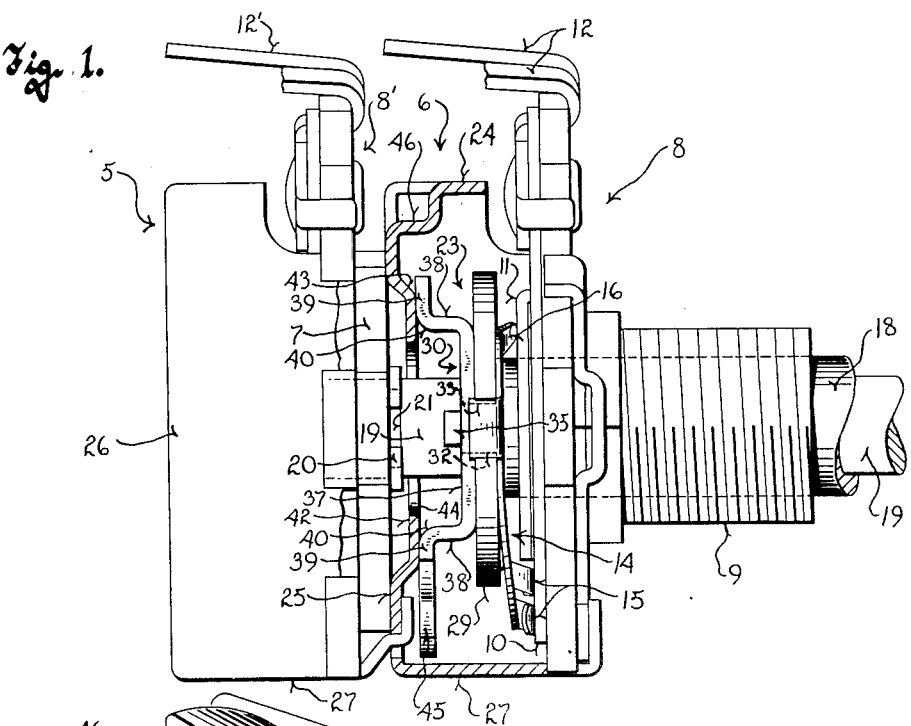

Feb. 10, 1953 W. H. BUDD 2,628,298
VARIABLE RESISTANCE DEVICE
Filed Jan. 4, 1951

Inventor
Wilbert H. Budd
By
Attorney

Patented Feb. 10, 1953

2,628,298

UNITED STATES PATENT OFFICE 2,628,298

VARIABLE RESISTANCE DEVICE

Wilbert H. Budd, Elkhart, Ind., assignor to Chicago Telephone Supply Corporation, Elkhart, Ind., a corporation of Indiana Application January 4, 1951, Serial No. 204,401

7 Claims. (Cl. 201—55)

1

This invention relates to electrical control instrumentalities and has more particular reference to variable resistance controls such as that forming the subject of Patent No. 2,484,667 issued to Mervin B. Arisman et al., October 11, 1949. Variable resistance controls of this type are used mainly in radio and television sets and are characterized by the fact that they comprise two control devices connected in tandem with the shaft of one hollow and having the shaft of the other rotatable therein.

In the variable resistance control of the aforesaid patent the hollow actuating shaft of one of the resistance devices was supported against rearward end thrust by the provision of a molded plastic end thrust bearing fixed on the inner or rear end of the actuating shaft and bearing against the rear wall of the housing at the interior thereof.

While this construction had certain advantages, it is the general purpose of this invention to provide an improved manner of supporting the actuating shaft against rearward end thrust, and which utilizes more conventional and economical stampings not only for the thrust bearing but for the other driven parts of the unit as well.

More specifically, it is the purpose of this invention to provide a variable resistance device with a stamped metallic bearing engageable with the rear end wall of the housing of the device in a unique manner to not only support the actuating shaft of the device against rearward end thrust, but to assure smooth running contact between the bearing and the housing wall with which it engages.

In this respect, it is a further object of this invention to provide a thrust bearing for the shaft of a variable resistance device of the character described, which bearing is comprised jointly by the metallic stamping affixed to the inner end of the actuating shaft and by an inwardly depressed central portion on the rear wall of the housing which has limited contact with areas of the stamping remote from any end or edge surfaces on the stamping so as to assure smooth operation of the shaft.

One of the main advantages of this invention, aside from simplicity and low cost, is that the stamped construction assures greater accuracy in the position of the movable contact carrier of the device with respect to the stationary resistance element with which it cooperates.

Another highly important advantage, however, is that the use of a metallic stamping for the thrust bearing assures greater life of the control device since its wearing qualities are far superior to those of molded plastics.

With these and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
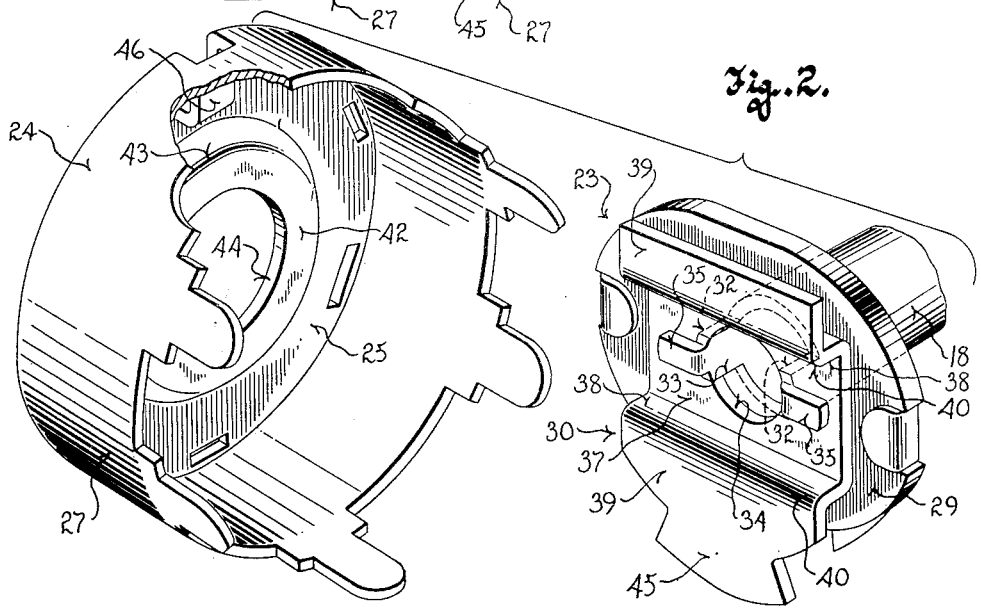

The accompanying drawing illustrates one complete example of the physical embodiment of the invention constructed according to the best mode so far devised for the practical application of the principles thereof, and in which:

Figure 1 is a side view of a dual or tandem variable resistance control constructed in accordance with this invention, parts thereof being broken away and in section; and Figure 2 is a separated perspective view showing the cup-shaped cover for the front unit of the control and the rear end of the actuating shaft for the front unit with the contact carrier and thrust bearing in place thereon.

Referring now particularly to the accompanying drawing, the numerals 5 and 6 designate the back and front units of a dual or tandem variable resistance control of the type shown and described in the aforesaid Patent No. 2,484,667, and now commonly used in radio and television sets. The rear unit 5 is attached to the back of the front unit in any suitable manner, preferably with a separator plate 7 interposed between the units, and the front wall or base 8 of the front unit has the customary externally threaded bushing 9 affixed thereto and projecting forwardly therefrom to provide for attachment of the tandem control to a panel (not shown).

An arcuate resistance strip 10 and a collector ring 11 are mounted on the rear face of the base 8, and the usual terminals 12 extend from the ends of the strip and the ring to be exposed at the exterior of the tandem control.

The rear unit 5 likewise has a base 8' which has a similar resistance strip and collector ring mounted on its inner face and electrically connected with terminals 12' at the exterior of the control.

In addition, each of the units has a contactor, indicated generally by the numeral 14, which overlies the inner face of the base of the unit in cooperative relationship with the resistance strip and collector ring to be rotated and advanced therealong to effect the desired variation in resistance by rotation of a shaft journalled in the base of the unit. The contactor, of course, includes the usual spring arms and fingers 15 and 16 projecting forwardly and bearing against the resistance strip and collector ring respectively.

A tubular shaft 18 journalled in the bushing 9 with its rear end passing through the base to project slightly beyond the rear surface thereof provides an actuator for rotating the contactor of the front unit 6; while a solid shaft 19 rotatable inside the tubular shaft projects rearwardly through it and the base 8' of the rear unit 5 to provide an actuator for the contactor therein.

As brought out in the aforementioned Patent No. 2,484,667 the solid shaft 19 for the rear unit 5 is easily supported against rearward end thrust by the provision of a C-washer 20 seated in an annular groove 21 in the shaft and bearing against the front face of the spacing plate 7, or directly against the base 8' if no spacing plate is used.

This expedient cannot be employed for supporting the tubular actuating shaft 18 against rearward end thrust thereon since the wall of this tubular shaft is relatively thin, and the cutting of an annular groove therein for the C-washer would seriously weaken the same. For this reason a novel driver generally designated 23 is affixed to the rear end of the tubular actuating shaft 18 and a cup-shaped cover 24 attached to the base 8 at the rear side thereof cooperates with the base to provide a housing enclosing the driver. The bottom or end wall 25 of the cover, of course, is spaced rearwardly of and substantially parallel to the base 8. It is to be understood that the rear unit 5 is provided with a similar cover 26; and each of the covers has a cylindrical side wall 27 concentric to the axis of the shafts 18 and 19.

The driver 23 comprises an insulating disc 29 which has the contactor 14 secured to the front thereof so as to serve as a carrier for the contactor, and a metallic stamping 30 overlying the rear side of the contact carrier and projecting toward the end wall 25 of the cover to engage the same and thus act as a thrust bearing to support the tubular actuating shaft 18 against rearward end thrust.

The driver is connected to the rear end of the actuating shaft 18 in a more or less conventional manner as seen best in Figure 2. As herein shown the tubular shaft 18 is provided with diametrically opposite rearwardly extending drive arms 32 on its rear extremity which are received in diametrically opposite notches 33 in the contactor carrier 29 and the stamping 30. It being understood that these notches open to central apertures 34 in the carrier and stamping which permit the passage of the solid actuating shaft 19 therethrough.

At their outer extremities the arms 32 are bent back over the rear side of the stamping 30, as at 35, to hold the carrier and the stamping confined between them and the rear end of the shaft from which the arms project. Hence, both the carrier and the stamping are held against rotative and axial motion relative to the shaft 18.

The stamping 30 has a special shape which enables it to provide not only firm support for any rearward end thrust imposed upon the shaft 18 but to enable it to have exceptionally smooth engagement with the rear wall 25 of the housing of the front unit. Accordingly the stamping is made U-shaped, and has its bight 37 seated on the drive arms 32 of the actuating shaft and comprising a flat hub held on the shaft in a position normal to the axis thereof and flatwise engaging the rear face of the contactor carrier. The legs 38 of the U-shaped stamping project rearwardly from the bight 37 at diametrically opposite sides of the axis of the actuating shaft and are parallel to one another.

Adjacent to their rear ends, however, the legs are bent laterally outwardly to provide coplanar runners or feet 39 thereon which are parallel to the bight 37. As seen best in Figure 2, the runners 39 have a length such that they extend parallel to one another and transversely of the unit substantial distances beyond the sides of the tubular actuating shaft 18 to overlie a considerable expanse of the adjacent inner surface of the rear end wall 25 of the housing. It is also to be noted that the undersides of the runners which face the wall 25 are perfectly smooth and that their surfaces join with the inner surfaces of the legs 38 by means of generous radii 40.

The runners 39, however, do not extend rearwardly as far as the plane of the rear wall 25 of the housing, but the central portion of the wall 25 is indented inwardly or forwardly toward the runners to define a raised central pad 42, circular in outline, which has its flat inner surface engaged by the runners. The peripheral portions of this pad curve back toward the plane of the back wall and are rounded as at 43, and the radius of the pad is somewhat less than the shortest radial dimension between the axis of the shaft and the outer extremities of the runners.

Also while the pad 42 has a central aperture 44 therein to receive the solid actuating shaft 19, the aperture has a diameter considerably smaller than the shortest radial dimension between the shaft axis and the inner sides of the legs 38 of the stamping. Consequently, the runners overhang the smooth cornered outer portion of the pad and extend transversely thereacross well beyond the areas of their engagement with the pad. These areas, in fact, are quite localized along the central inner portions of the runners so as to preclude any contact between the runners and the pad which might bring sharp edges or ends on either into engagement with the other. As a result, therefore, exceptionally smooth operation of the unit is assured, along with good stability and support for the shaft against rearward end thrust thereon.

If desired, one of the legs or runners 39 can be extended radially outwardly as at 45 to be engageable with an inwardly indented portion 46 on the rear corner of the cover to provide rotation limiting means for the actuating shaft 18.

With the construction of the driver described it will be noted that its components, namely the flat insulating contact disc 29 and the U-shaped thrust bearing 30, can be formed of stampings to assure low cost and easy fabrication. In addition this construction assures greater accuracy in the position of the contact carrier and consequently the contactor with respect to the base of the unit than was hitherto possible, and thus enables the spring arms and fingers on the contactor to be held under the proper degree of tension required for smooth operation of the unit and good electrical contact. Moreover, since the elements which engage to transmit rearward end thrust on the tubular shaft 18 to the housing of the unit are of metal, contact pressure will not diminish at as great a rate due to wear as when one of the elements is made of plastic material.

While this invention has been described as being particularly suitable in dual or tandem controls where one of the actuating shafts is tubular and the other solid, it is also advantageous for use in single variable resistance control devices having solid actuating shafts.

From the foregoing description taken together with the accompanying drawing it will be readily apparent to those skilled in the art that this invention provides an improved manner of supporting the operating shaft of an electrical control instrumentality against rearward thrust thereon, and which assures smooth operation of the instrumentality while featuring simplicity and low cost of construction.

What I claim as my invention is:

1. In a variable resistance device of the type in which a resistance element on the inner face of a base of insulating material which forms the front wall of a housing for the device is traversed by a spring contactor mounted upon a rotatable actuating shaft which passes through the hole in a base, and wherein the spring tension of the contactor reacting against the resistance element biases the control shaft endwise toward the rear of the device: a cover attached to the base over the rear face thereof and coacting with the base to complete the housing for the device, said cover having a wall substantially normal to the shaft axis and adjacent to the rear end of the shaft; a disc-like carrier for the spring contactor fixed to the shaft inside the housing, said carrier being formed of insulating material and having the contactor mounted upon its front face; and a stiff metal stamping seated upon the rear face of the carrier and having rearwardly extending portions provided with runners which lie in a plane normal to the shaft axis and rearwardly of the rearmost end of the shaft, said runners slidably engaging said wall of the cover and providing a thrust bearing supporting the shaft against rearward end thrust thereon.

2. In a variable resistance device, the structure defined in claim 1 further characterized by the fact that said stiff metal stamping has a substantially flat hub portion fixed on the rear end of the actuating shaft, legs extending rearwardly from diametrically opposite sides of said hub portion toward the rear end wall of the housing, and feet extending laterally from the rear extremities of said legs and projecting outwardly away from the shaft axis, said feet having flat surfaces lying in a plane normal to the shaft axis and rearwardly of the rearmost end of the shaft, and said flat surfaces of the feet slidably riding upon said rear wall of the housing to support the shaft against rearward end thrust.

3. The electrical control device set forth in claim 2 wherein a central portion of said rear end wall of the housing is depressed inwardly into the housing and has a flat circular surface upon which the flat surfaces on the feet ride.

4. The electrical control device set forth in claim 3 further characterized by the provision of cooperating rotation stops on the shaft and the housing, the shaft carried stop comprising a lateral extension of one of said feet on the stamping, in the plane thereof, extending outwardly away from the shaft axis.

5. In an electrical control device: a housing having opposing front and rear walls; an actuating shaft rotatably journalled in the front wall and having its rear end disposed inside the housing and facing but spaced from the rear wall thereof; a stationary element inside the housing secured to the front wall thereof; a rotatable element cooperable with said stationary element and comprising a flat disc of insulating material fixed no the rear end portion of the actuating shaft, and a contactor secured to said disc and engaged with the stationary element; and means for precluding axial motion of the actuating shaft in a direction tending to separate the contactor from said stationary element, said means comprising a substantially U-shaped stamping having its bight fixed on the rear end of the shaft and bearing against the rear of the insulating disc, and its legs projecting rearwardly toward the rear end wall of the housing, and laterally outwardly extending feet on the rear extremities of said legs having flat surfaces at their undersides flatwise engaging the rear end wall of the housing to support the shaft against rearward end thrust thereon and to hold the contactor in proper cooperative relationship with said stationary element.

6. In an electrical control device: a housing having opposing front and rear end walls; cooperating rotatable and stationary elements inside the housing, the stationary element being carried by the front end wall of the housing between the front wall and the rotatable element; a tubular actuating shaft rotatably journalled in said front end wall of the housing and having its rear end projecting inside the housing and facing but spaced from the rear wall thereof; a rotation transmitting connection between the rotatable element and the rear end of said tubular actuating shaft; cooperating means on the rotatable element and the tubular actuating shaft for precluding axial motion of the rotatable element forwardly along said shaft; and common means for precluding rearward axial motion of the rotatable element relative to the tubular shaft and for transmitting end thrust on said shaft to the rear wall of the housing, said common means comprising a substantially U-shaped stamping having its bight bearing against the rear of the rotatable member, tongues on the rearmost end of the tubular shaft passing through and bent over the bight of said U-shaped stamping, and runner surfaces on the legs of said U-shaped stamping constituting the rearmost portions thereof, said runner surfaces being slidably engaged with the rear wall of the housing.

7. In an electrical control device having cooperating rotatable and stationary elements: a housing in which said elements are inclosed, said housing having opposing front and rear end walls; an actuating shaft rotatably journalled in the front end wall of the housing and having its rear end projecting into the interior of the housing and terminating in spaced relationship to the rear end wall of the housing; a rotation transmitting connection between the rear end portion of the shaft and the rotatable element inside the housing; and means for precluding rearward axial motion of the actuating shaft relative to the housing and for transmitting rearward end thrust on the shaft directly onto the rear wall of the housing, said means comprising a central inwardly projecting circular pad on said rear end wall of the housing having a flat surface facing the rear end of the shaft and lying in a plane normal to its axis, the periphery of said pad being smoothly rounded, and a stiff relatively shallow U-shaped stamping having its bight fixed to the rear end of the shaft with its legs directed rearwardly and having outward oppositely directed flanges on the rear extremities of its legs, the rear surfaces of said flanges lying in a plane normal to the shaft axis and rearwardly of the rearmost portion of the shaft, said rear surfaces of the flanges slidably bearing upon the pad, the junctions of the legs and their respective flanges being rounded and smooth, and the flanges being of a size such that the shortest radial distance from the outer edges to the shaft axis is greater than the radius of the pad so that the outer edges of the flanges overhang the pad.

WILBERT H. BUDD.

REFERENCES CITED

The following references are of record in the file of this patent:

UNITED STATES PATENTS

| Number | Name | Date |
|---|---|---|
| 2,358,991 | Miller | Sept. 26, 1944 |
| 2,458,314 | Straub et al. | Jan. 4, 1949 |
| 2,484,667 | Arisman et al. | Oct. 11, 1949 |
| 2,536,181 | Hultgren | Jan. 2, 1951 |